United States Patent
Kobayashi et al.

(10) Patent No.: US 10,975,187 B2
(45) Date of Patent: Apr. 13, 2021

(54) MODIFIED POLYTETRAFLUOROETHYLENE FINE POWDER AND ITS MANUFACTURING METHOD, AND ELECTRIC WIRE AND TUBE USING IT

(71) Applicants: AGC Inc., Chiyoda-ku (JP); AGC CHEMICALS EUROPE, LIMITED, Thornton-Cleveleys (GB)

(72) Inventors: Shigeki Kobayashi, Chiyoda-ku (JP); Ariana Claudia Morgovan-Ene, Thornton-Cleveleys (GB); Anthony Eugene Wade, Thornton-Cleveleys (GB)

(73) Assignees: AGC Inc., Chiyoda-ku (JP); AGC CHEMICALS EUROPE, LIMITED, Thornton-Cleveleys (GB)

( * ) Notice: Subject to any disclaimer, the term of this patent is extended or adjusted under 35 U.S.C. 154(b) by 616 days.

(21) Appl. No.: 15/789,320

(22) Filed: Oct. 20, 2017

(65) Prior Publication Data

US 2018/0037689 A1    Feb. 8, 2018

Related U.S. Application Data

(63) Continuation of application No. PCT/JP2016/059722, filed on Mar. 25, 2016.

(30) Foreign Application Priority Data

Apr. 22, 2015    (JP) .............................. JP2015-087700

(51) Int. Cl.
| | |
|---|---|
| C08F 259/08 | (2006.01) |
| C08F 214/26 | (2006.01) |
| C09D 5/03 | (2006.01) |
| C09D 127/18 | (2006.01) |
| C09D 151/00 | (2006.01) |
| H01B 3/44 | (2006.01) |
| H01B 7/02 | (2006.01) |
| H01B 13/00 | (2006.01) |
| H01B 17/58 | (2006.01) |
| C08F 214/28 | (2006.01) |
| C08F 216/14 | (2006.01) |

(52) U.S. Cl.
CPC ........ C08F 259/08 (2013.01); C08F 214/262 (2013.01); C09D 5/03 (2013.01); C09D 127/18 (2013.01); C09D 151/003 (2013.01); H01B 3/44 (2013.01); H01B 7/02 (2013.01); H01B 13/00 (2013.01); H01B 17/58 (2013.01); C08F 214/28 (2013.01); C08F 216/1408 (2013.01)

(58) Field of Classification Search
CPC .. C08F 259/08; C08F 214/262; C08F 214/28; C08F 216/1408; C09D 5/03; C09D 127/18; C09D 151/003; H01B 3/44; H01B 7/02; H01B 13/00; H01B 17/58
USPC ......................................................... 428/375
See application file for complete search history.

(56) References Cited

U.S. PATENT DOCUMENTS

| | | |
|---|---|---|
| 4,636,549 A | 1/1987 | Gangal et al. |
| 4,792,594 A | 12/1988 | Gangal et al. |
| 4,837,267 A | 6/1989 | Malhotra |
| 4,879,362 A | 11/1989 | Morgan |
| 5,731,394 A * | 3/1998 | Treat ................... C08F 214/262 526/206 |
| 6,011,113 A | 1/2000 | Konabe |
| 2008/0020159 A1 | 1/2008 | Taira et al. |
| 2008/0281067 A1 | 11/2008 | Nanba et al. |
| 2013/0281558 A1 | 10/2013 | Sawada et al. |
| 2014/0291845 A1 | 10/2014 | Miyata et al. |
| 2015/0091169 A1 | 4/2015 | Miyata et al. |
| 2015/0311165 A1 | 10/2015 | Miyata et al. |

FOREIGN PATENT DOCUMENTS

| | | | | |
|---|---|---|---|---|
| EP | 2 657 291 A1 | 10/2013 | | |
| EP | 2657291 A1 * | 10/2013 | ............. | C08L 27/18 |
| JP | 59-115313 | 7/1984 | | |
| JP | 60-042446 | 3/1985 | | |
| JP | 01-278506 | 11/1989 | | |
| JP | 09-087334 | 3/1997 | | |
| JP | 11-509245 | 8/1999 | | |
| JP | 11-240917 | 9/1999 | | |
| WO | WO 2005/097847 A1 | 10/2005 | | |
| WO | WO 2006/054612 A1 | 5/2006 | | |

OTHER PUBLICATIONS

International Search Report dated Jun. 28, 2016 in PCT/JP2016/059722 filed Mar. 25, 2016.

* cited by examiner

*Primary Examiner* — Bijan Ahvazi
*Assistant Examiner* — Ronald Grinsted
(74) *Attorney, Agent, or Firm* — Oblon, McClelland, Maier & Neustadt, L.L.P.

(57) ABSTRACT

To optimize the primary particle size of a modified PTFE fine powder to shorten the sintering time during the extrusion molding.

A modified polytetrafluoroethylene fine powder which is a fine powder of a non-melt-processable modified polytetrafluoroethylene comprising units derived from tetrafluoroethylene, units derived from hexafluoropropylene, units derived from a perfluoro(alkyl vinyl ether) represented by $CF_2=CFO-C_nF_{2n+1}$ (n is an integer of from 1 to 6) and units derived from a (perfluoroalkyl)ethylene represented by $CH_2=CH-C_mF_{2m+1}$ (m is an integer of from 3 to 7).

12 Claims, No Drawings

MODIFIED POLYTETRAFLUOROETHYLENE FINE POWDER AND ITS MANUFACTURING METHOD, AND ELECTRIC WIRE AND TUBE USING IT

TECHNICAL FIELD

The present invention relates to a modified polytetrafluoroethylene fine powder and its manufacturing method, and an electric wire using the polytetrafluoroethylene fine powder as a coating material and a tube.

BACKGROUND ART

A fine powder of a polytetrafluoroethylene (hereinafter referred to also as "PTFE") is manufactured by a method such that tetrafluoroethylene (hereinafter referred to also as "TFE") is polymerized by an emulsion polymerization method in which polymerization is carried out with an emulsifier in an aqueous medium to obtain PTFE fine particles, followed by coagulating the PTFE fine particles.

PTFE cannot be molded by a melt processing method such as extrusion molding to be applied for ordinary thermoplastic resins, since PTFE has an extremely high melt viscosity. Thus, as the method for processing PTFE, a paste extrusion molding method in which a fine powder of PTFE is mixed with a lubricant and extruded, is employed. As a processed product formed by the paste extrusion molding method, a coating of an electric wire, a tube and a sealing material may, for example, be mentioned.

A method is known that in order to improve the processability at the time of paste extrusion molding PTFE, PTFE is modified with a small amount of a comonomer which can be copolymerized with TFE, and a fine powder of the modified PTFE is prepared.

For example, Patent Document 1 discloses a method for producing a modified PTFE fine powder having a core-shell structure by using a (perfluorobutyl)ethylene (hereinafter referred to also as "PFBE") as a comonomer for forming a core and using hexafluoropropylene (hereinafter referred to also as "HFP") as a comonomer for forming a shell.

Patent Document 2 discloses a method for manufacturing a modified PTFE fine powder by using as comonomers, a (perfluoroalkyl)ethylene and a fluoro(alkyl vinyl ether) or a fluoroolefin, as a suitable technique for a coating material of an electric wire.

PRIOR ART DOCUMENTS

Patent Documents
Patent Document 1: JP-A-H09-87334
Patent Document 2: JP-A-H11-509245

DISCLOSURE OF INVENTION

Technical Problem

When producing an electric wire or a tube, it is necessary to extrude a paste state preform prepared by mixing a lubricant in a modified PTFE fine powder into the coating form on the circumference of a wire or the tubular form by the extrusion molding method, followed by drying and sintering.

According to the knowledge of the present inventors, etc., in a case where the sintering condition is consistent, even though the composition of the modified PTFE fine powder is the same, the appearance of the final product may deteriorate, and the time required for the sintering may be prolonged in some cases. As a result of various studies on their causes, it has been found that the larger primary particle size of the modified PTFE fine powder causes the undesirable phenomena, etc.

The present invention has been made in view of the above circumstances, and it is an object of the present invention to provide a modified PTFE fine powder of which the primary particle size is made to be small, whereby the sintering time during the extrusion molding can be shortened, its production method and an electric wire using the modified PTFE fine powder as a coating material and tubes.

Solution to Problem

The present invention provides the modified PTFE fine powder, its manufacturing method, an electric wire using it and a tube using it, which has the following constructions [1] to [12].

[1] A modified polytetrafluoroethylene fine powder which is a fine powder of a non-melt-processable modified polytetrafluoroethylene, wherein the modified polytetrafluoroethylene comprises units derived from tetrafluoroethylene, units derived from hexafluoropropylene, units derived from a perfluoro(alkyl vinyl ether) represented by the formula (I) and units derived from a (perfluoalkyl)ethylene represented by the formula (II):

wherein n is an integer of from 1 to 6,

wherein m is an integer of from 3 to 7.

[2] The modified polytetrafluoroethylene fine powder according to the above [1], which has an average primary particle size of from 0.20 to 0.28 µm.

[3] The modified polytetrafluoroethylene fine powder according to the above [1] or [2], wherein the sum of the units derived from hexafluoropropylene, the units derived from a perfluoro(alkyl vinyl ether) and the units derived from a (perfluoalkyl)ethylene, is at most 0.3 mass %, per the total fine powder.

[4] The modified polytetrafluoroethylene fine powder according to any one of the above [1] to [3], wherein the units derived from hexafluoropropylene is from 0.005 to 0.090 mass %, the units derived from a perfluoro(alkyl vinyl ether) is from 0.01 to 0.20 mass %, and the units derived from a (perfluoalkyl)ethylene is from 0.001 to 0.010 mass %, per the total fine powder.

[5] The modified polytetrafluoroethylene fine powder according to any one of the above [1] to [4], which has a core-shell structure comprising a core part made of a modified PTFE having no unit derived from the hexafluoropropylene and a shell part made of a modified PTFE having units derived from the hexafluoropropylene.

[6] The modified polytetrafluoroethylene fine powder according to the above [5], wherein the core part:shell part representing the mass ratio of the core part to the shell part is from 70:30 to 95:5.

[7] A method for manufacturing a modified polytetrafluoroethylene fine powder which is a method for manufacturing the modified polytetrafluoroethylene fine powder as defined in any one of the above [1] to [6] and which has a first step of polymerizing tetrafluoroethylene, the perfluoro(alkyl vinyl ether) and the (perfluoalkyl)ethylene in the presence of an aqueous medium, a polymerization initiator and an emulsifier and a second step of adding hexafluoropropylene so as to be polymerized with tetrafluoroethylene.

[8] The method for manufacturing the modified polytetrafluoroethylene fine powder according to the above [7], wherein the modified polytetrafluoroethylene fine powder has a core-shell structure and wherein in the first step, tetrafluoroethylene is continuously or intermittently supplied to a polymerization reactor, and at a time when from 70 to 95 mass % of tetrafluoroethylene in the total amount to be used in the polymerization reaction is supplied, the second step is initiated by adding hexafluoropropylene.

[9] The method for producing the modified polytetrafluoroethylene fine powder according to the above [7] or [8], wherein the emulsifier is at least one fluorinated emulsifier selected from the group consisting of a $C_{5-8}$ fluorinated carboxylic acid having an etheric carbon atom and salts thereof.

[10] The modified polytetrafluoroethylene fine powder according to any one of the above [1] to [6], which is to be used for coating an electric wire or for producing a tube. [11] An electric wire having a coating layer produced by using the modified polytetrafluoroethylene fine powder as defined in the above [10].

[12] A tube produced by using the modified polytetrafluoroethylene fine powder as defined in the above [10].

Advantageous Effects of Invention

According to the present invention, it is possible to reduce the primary particle size of the modified PTFE fine powder, whereby it is possible to shorten the sintering time during the extrusion molding.

The modified PTFE fine powder of the present invention is suitable as materials for a tube and an electric wire coating layer, and the modified TFE powder has a small primary particle size, whereby the modified PTFE fine powder can be sufficiently sintered, even though the sintering time is short in the production steps for the tube and the electric wire. Accordingly, a tube and an electric wire in which defects such as voids due to insufficient sintering are prevented, can be obtained.

DESCRIPTION OF EMBODIMENTS

In the present invention, "modified PTFE fine powder" means particles of a copolymer obtained by polymerizing TFE in the presence of a comonomer (The comonomer is also called a modifier.) which can be copolymerized with TFE. The amount of the comonomer to be used may be set within the range that the inert non-melt-processability of PTFE is not impaired.

It is considered that in the modified PTFE fine powder, the comonomer is contained in the polymerized state (namely, the state that TFE and each comonomer are copolymerized). Further, in the copolymer (modified PTFE) of TFE and the comonomer, a portion derived from TFE and a portion derived from the comonomer are called "units", and "units" derived from each monomer is represented by "units" accompanied by the name of the monomer.

In the mass of the total particles of the modified PTFE fine powder, the mass of polymer components other than the TFE units and the comonomer units (for example, a residue of a polymerization initiator) and components other than the polymer (for example, residues of an aqueous medium, an unreacted polymerization initiator, a decomposed polymerization initiator, an emulsifier, etc.) is at the level of a trace amount and can be ignored.

The "core-shell structure" of the modified PTFE fine powder means having a core part made of one unit composition of a modified PTFE as the central part of particles and a shell part formed on the outside of the core part and made of a unit composition of a modified PTFE different from the core part.

"Average primary particle size" of the modified PTFE fine powder means a median size based on volume measured by the laser scattering method particle size distribution analyzer.

"Standard specific gravity (hereinafter referred to also as "SSG")" of the modified PTFE fine powder is an index of the molecular weight, and the higher the SSG is, the smaller the molecular weight is. The measuring condition is described later.

"Paste extrusion pressure" of the modified PTFE fine powder means the pressure required for paste-extrusion, when preparing a paste state modified PTFE fine powder under the predetermined condition and paste extruding it under the predetermined condition. The measuring condition is described later.

<Modified PTFE Fine Powder>

The modified PTFE fine powder of the present invention is "non-melt-processable".

The "non-melt-processable" means "cannot be melt-processed", namely, having no melt-processability. Specifically, the non-melt-processable means having less than 0.5 g/10 min of a melt flow rate measured in accordance with ASTM D3307 at the measuring temperature of 372° C. and at a load of 49N.

The modified PTFE fine powder of the present invention preferably has an average primary particles size of from 0.20 to 0.28 μm, more preferably from 0.21 to 0.27 μm, further preferably from 0.22 to 0.26 μm.

The smaller the average primary particles size is, the more the stability of the modified PTFE aqueous emulsion improves, however, if too stabilized, the modified PTFE aqueous emulsion hardly coagulates. That is, at the time of applying stirring shearing force to the modified PTFE aqueous emulsion to coagulate the PTFE emulsion to obtain a fine powder, it is necessary to spend time and labor, and thereby, the production efficiency tends to be low. On the other hand, if the average primary particle size is too large, not only the time required for sintering during the paste extrusion molding is long, but also the stability of the modified PTFE aqueous emulsion is low. If the stability of the modified PTFE aqueous emulsion is insufficient, many problems may result on the production such that the amount of coagulum increases during the emulsion polymerization, which leads to the low production efficiency, a large amount of coagulum is formed at the time of concentrating the PTFE aqueous emulsion after the emulsion polymerization, and a large amount of coagulum is formed during a process to transfer the aqueous emulsion, which leads to clogging of pipe lines.

When the average primary particle size of the modified PTFE fine powder falls within the above range, a modified PTFE aqueous emulsion having stability suitable to prevent such problems tends to be obtained.

The modified PTFE fine powder of the present invention is obtained by using as modifiers, hexafluoropropylene (HFP) and comonomers containing a perfluoro(alkyl vinyl ether) represented by the following formula (I) (hereinafter referred to also as "monomer (I)") and a (perfluoroalkyl) ethylene represented by the formula (II) (hereinafter referred to also as "monomer (II)") in the polymerization reaction of tetrafluoroethylene (TFE).

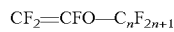
(I)

wherein n is an integer of from 1 to 6.

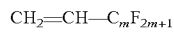
(II)

wherein m is an integer of from 3 to 7.
[Monomer (I)]

In the formula (I), $-C_nF_{2n+1}$ is a perfluoroalkyl group wherein the carbon number (n) is from 1 to 6. The perfluoroalkyl group may be linear or branched. The carbon number (n) is preferably from 1 to 3 from the viewpoint of the industrial availability.

A perfluoro(propyl vinyl ether) represented by $CF_2=CF-O-C_3F_7$ (hereinafter referred to also as "PPVE") is particularly preferred, since it is liquid at normal temperature, and its handling ability is good.

One type of the monomer (I) may be used, or two or more types may be used in combination. PPVE is preferably at least 60 mass %, more preferably at least 80 mass %, particularly preferably 100 mass %, per the sum of the monomer (I).

[Monomer (II)]

In the formula (II), $-C_mF_{2m+1}$ is a perfluoroalkyl group wherein the carbon number (m) is from 3 to 7. The perfluoroalkyl group may be linear or branched.

PFBE represented by $CH_2=CH-(CF_2)_4F$ is particularly preferred, since the reactivity of the monomer tends to be good, and most of added monomers is polymerized.

One type of the monomer (II) may be used, or two or more types may be used in combination. PFBE is preferably at least 60 mass %, more preferably at least 80 mass %, particularly preferably 100 mass %, per the sum of the monomer (II).

[Content of Comonomers]

The sum of the contents of the comonomer units per the total particles of the modified PTFE fine powder may be set within the range so that the modified PTFE fine powder would have a non-melt-processability.

Particularly from the viewpoint of maintaining the non-melt-processability, the sum of the contents of the comonomer units is preferably at most 0.3 mass %, more preferably at most 0.2 mass %, further preferably at most 0.15 mass %.

The content of HFP units is preferably from 0.005 to 0.090 mass %, more preferably from 0.005 to 0.060 mass %, further preferably from 0.007 to 0.030 mass %, per the total particles of the modified PTFE fine powder. When the content of HFP units is at least the lower limit value of the above range, good extrusion property at a high rate extrusion tends to be obtained. When the content of HFP units is at most the above upper limit value, the polymerization time will not be too long.

The content of the monomer (I) units is preferably from 0.01 to 0.20 mass %, more preferably from 0.01 to 0.09 mass %, further preferably from 0.015 to 0.08 mass %. When the content of the monomer (I) units is at least the lower limit value of the above range, a product after sintering tends to have good transparency. When the content of the monomer (I) units is at most the upper limit value, the polymerization time will not be too long.

The content of the monomer (II) units is preferably from 0.001 to 0.010 mass %, more preferably from 0.001 to 0.009 mass %, further preferably from 0.002 to 0.009 mass %. When the content of the monomer (II) units is at least the lower limit value of the above range, the primary particle size of the PTFE particles in the aqueous emulsion is easily controlled. When the content of the monomer (II) units is at most the upper limit value, a final product tends to have good heat resistance.

It is particularly preferred that the contents of the respective monomer units fall within the above ranges respectively, and the sum of the contents of the comonomer units falls within the above range.

The comonomers to be used for manufacturing the modified PTFE fine powder may contain comonomers to be copolymerized with TFE other than HFP, the monomers (I) and the monomers (II), so far as the effects of the present invention are not impaired.

The sum of HFP units, the monomer (I) units and the monomer (II) units is preferably at least 60 mass %, more preferably at least 80 mass %, further preferably at least 90 mass %, per the total of the comonomer units contained in the modified PTFE fine powder. The sum of HFP units, the monomer (I) units and the monomer (II) units may be 100 mass %.

[Core-Shell Structure]

The modified PTFE fine powder of the present invention preferably has a core-shell structure. Specifically, the modified PTFE fine powder preferably has a core part made of a modified PTFE having no HFP unit and a shell part made of a modified PTFE having HFP units.

The modified PTFE of the core part preferably has no HFP unit and has the monomer (I) units and the monomer (II) units.

The modified PTFE of the shell part may have only HFP units as comonomer units and may further have the monomer (I) units.

The mass ratio of the core part to the shell part (core part:shell part) constituting the particles of the modified PTFE fine powder is preferably from 70:30 to 95:5, more preferably from 80:20 to 95:5, further preferably from 85:15 to 92:8.

When the proportion of the core part is at least the lower limit value of the above range, the polymerization time will not be too long. When the proportion of the core part is at most the upper limit value, good extrusion property tends to be obtained.

[Specific Gravity (SSG)]

The modified PTFE fine powder of the present invention has SSG of preferably from 2.140 to 2.220, more preferably from 2.160 to 2.210, further preferably from 2.170 to 2.205.

The small value of SSG means that the content of the comonomer units in the modified PTFE is large. If the content of the comonomers is too large, the average primary particle size of the modified PTFE fine powder becomes too small, and the stability of the modified PTFE aqueous emulsion becomes excessively high. On the other hand, the large value of SSG means that the molecular weight of the modified PTFE is low. If the molecular weight is too low, respective physical properties of a final product tend to be low. When the modified PTFE fine powder has SSG within the above range, the modified PTFE aqueous emulsion tends to have appropriate stability, and a final product tends to have good physical properties.

SSG of the modified PTFE fine powder can be controlled by polymerization conditions such as the polymerization pressure at the time of polymerizing TFE and comonomers.

[Paste Extrusion Pressure]

The paste extrusion pressure of the modified PTFE fine powder of the present invention is preferably from 20 to 50 MPa, more preferably from 25 to 45 MPa. When the paste extrusion pressure is at least the lower limit value of the above range, a final product after sintering tends to have good mechanical strength. On the other hand, if the paste extrusion pressure is too high, appearance defects such as surface roughness of a final product may result. When the paste extrusion pressure is at most the upper limit value of the above range, a final product tends to have good appearance.

<Method for Manufacturing Modified PTFE Fine Powder>

The modified PTFE fine powder of the present invention can be manufactured by a method (emulsion polymerization method) of copolymerizing TFE and comonomers in the presence of an aqueous medium, a polymerization initiator and an emulsifier.

TFE is continuously or intermittently added to a polymerization reactor.

Comonomers may be collectively added at the time of initiating the polymerization or may be dividedly supplied during the polymerization.

Preferred is a method having a first step of polymerizing TFE, the monomer (I) and the monomer (II) and a second step of adding HFP and polymerizing it.

Employing the method having the first step and the second step, a modified PTFE fine powder having a core part made of a modified PTFE having no HFP unit and a shell part made of a modified PTFE having HFP units can be manufactured. The first step and the second step will be described later.

[Aqueous Medium]

The aqueous medium may, for example, be water or a mixture of water and an aqueous organic solvent.

The aqueous organic solvent may, for example, be tert-butanol, propylene glycol, dipropylene glycol, dipropylene glycol monomethyl ether or tripropylene glycol.

When the water medium contains an aqueous organic solvent, the content of the aqueous organic solvent is preferably from 1 to 40 parts by mass, more preferably from 3 to 30 parts by mass, per 100 parts by mass of water.

[Emulsifier]

As the emulsifier, a known emulsifier to be used in emulsion polymerization of TFE may be used.

A fluorinated emulsifier is preferred, since it will not interfere the polymerization reaction of TFE by chain transfer reaction in an aqueous medium. One type of the emulsifier may be used, or two or more types may be used in combination.

The fluorinated emulsifier is particularly preferably one selected from the group consisting of a $C_{5-8}$ fluorinated carboxylic acid having an etheric oxygen atom and salts thereof. Such a fluorinated emulsifier has an etheric oxygen atom and a low molecular weight and is therefore considered to have a low residual nature and a low accumulation property in vivo.

The fluorinated carboxylic acid is a compound having an etheric oxygen atom in a $C_{5-8}$ carbon chain (main chain) and having —COOH at a terminal. —COOH at a terminal may form a salt. The etheric oxygen atom in the main chain is at least 1, preferably from 1 to 4.

As preferred specific examples of the fluorinated carboxylic acid, $C_3F_7OCF_2CF_2OCF_2COOH$, $C_4F_9OCF_2CF_2OCF_2COOH$, $C_2F_5OCF_2CF_2OCF_2CF_2OCF_2COOH$, $C_3F_7OCF(CF_3)CF_2OCHFCOOH$, $CF_3OCF_2OCF_2OCF_2OCF_2COOH$, $CF_3O(CF_2CF_2O)_2CF_2COOH$, $CF_3CF_2O(CF_2)_5COOH$, $CF_3CFHO(CF_2)_5COOH$, $CF_3OCF(CF_3)CF_2OCF(CF_3)COOH$, $CF_3OC_3F_6OCF(CF_3)COOH$, $CF_3O(CF_2)_3OCHFCF_2COOH$, $C_4F_9OCF(CF_3)COOH$, $C_4F_9OCF_2CF_2COOH$, $CF_3OCF_2CF_2CF_2OCF_2COOH$, $C_2F_5OCF_2CF_2OCF_2COOH$, $CF_3O(CF_2)_3OCHFCOOH$, $CF_3OCF_2OCF_2OCF_2COOH$, $C_4F_9OCF_2COOH$, $C_3F_7OCF_2CF_2COOH$, $C_3F_7OCHFCF_2COOH$, $C_3F_7OCF(CF_3)COOH$, $CF_3CFHO(CF_2)_3COOH$, $CF_3OCF_2CF_2OCF_2COOH$, $C_2F_5OCF_2CF_2COOH$, $C_3F_7OCHFCOOH$ and $CF_3OCF_2CF_2COOH$, and their salts with Li, Na, K, $NH_4$, etc., may be mentioned.

As more preferred specific examples, $CF_3OC_3F_6OCF(CF_3)COOH$, $C_2F_5OC_2F_4OCF_2COOH$, $C_3F_7OCF_2CF_2COOH$, $CF_3OC_2F_4OCF_2COOH$, $C_4F_9OCF_2COOH$ and $C_3F_7OCF(CF_3)COOH$, and their salts with Li, Na, K, $NH_4$, etc., may be mentioned. Particularly preferred examples are ammonium salts ($NH_4$) of the above compounds. Given that the ammonium salt is excellent in the solubility in an aqueous medium and is free from such a risk that metal ion components will remain as impurities in the PTFE fine powder and in the final product.

The sum of the amounts of the emulsifier to be used is preferably from 1,500 to 20,000 ppm, more preferably from 2,000 to 20,000 ppm, further preferably from 2,000 to 15,000 ppm per the final yield of the modified PTFE.

When the sum of the amounts of the emulsifier to be used is at least the lower limit value of the above range, the emulsion stability tends to be good during the polymerization. If the sum of the amounts of the emulsifier to be used exceeds the upper limit value of the above range, the emulsion stability so as to commensurate with the amount to be used cannot be obtained.

[Polymerization Initiator]

As the polymerization initiator, a known radical polymerization initiator to be used for the emulsion polymerization of TFE may be used. For example, a water-soluble radical polymerization initiator, a water-soluble redox catalyst, etc. may be mentioned.

As the water-soluble radical polymerization initiator, a persulfate such as ammonium persulfate or potassium persulfate, or a water-soluble organic peroxide such as disuccinic acid peroxide, bis glutaric acid peroxide or tert-butyl hydroperoxide, is preferred.

As the water-soluble redox catalyst, preferred is a combination of an oxidizing agent such as bromic acid or its salt, chloric acid or its salt, persulfuric acid or its salt, permanganic acid or its salt, or hydrogen peroxide, and a reducing agent such as sulfurous acid or its salt, hydrogen sulfurous acid or its salt, thiosulfuric acid or its salt, or an organic acid.

As the polymerization initiator, one type may be used alone, or two or more types may be used in combination. Particularly, a persulfate and disuccinic acid peroxide are preferably used in combination from the viewpoint of maintaining the stability of an aqueous emulsion during the polymerization.

The sum of the amounts of the polymerization initiator to be used is preferably from 0.0005 to 0.20 mass %, more preferably from 0.001 to 0.15 mass % per the final yield of PTFE.

[Stabilizing Aid]

For the emulsion polymerization of TFE, it is preferred to further add a stabilizing aid.

The stabilizing assistant is preferably a paraffin wax, a fluorinated oil, a fluorinated solvent or a silicone oil. As the stabilizing aid, one type may be used alone, or two or more types may be used in combination.

Particularly, the paraffin wax is more preferred. The paraffin wax may be liquid, semisolid or solid at room temperature and is preferably a saturated hydrocarbon having at least 12 carbon atoms. The melting point of the paraffin wax is preferably from 40 to 65° C., more preferably from 50 to 65° C.

The sum of the amounts of the stabilizing agent to be used is preferably from 0.1 to 12 mass %, more preferably from 0.1 to 8 mass % per the aqueous medium to be used.

When the amounts of the stabilizing aid to be used is at least the lower limit value of the above range, an emulsion tends to have good stability during the polymerization. If the stability of an emulsion during the polymerization is impaired, a large amount of coagulum may be formed. When the sum of the amount of the stabilizing aid to be used is at least the upper limit value, the stabilizing aid can be easily separated and removed after the polymerization.

[First Step]

In the first step, TFE, the monomer (I) and the monomer (II) are polymerized. The monomer (II) has sufficient copolymerization reactivity with TFE. It is preferred to polymerize the full amount (the total of charged amounts) of the monomer (II) in the first step.

In the first step, TFE, the monomer (I) and the monomer (II) are polymerized, whereby a core part of particles are formed.

As the method of adding the monomer (I) and the monomer (II), a method (initial one time addition) of charging the total amount to a polymerization reactor before starting the polymerization reaction is preferred. Specifically, preferred is a method of preliminary charging an aqueous medium, an emulsifier, a stabilizing aid, a monomer (I) and a monomer (II) to a polymerization reactor and supply TFE and a polymerization initiator to initiate the polymerization reaction.

TFE is preferably supplied to the polymerization reactor continuously or intermittently.

[Second Step]

In the second step, monomers containing at least TFE and HFP are polymerized to form a shell part at the outside of the core part formed in the first step. Accordingly, fine particles having a core-shell structure is manufactured.

In the second step, it is preferred to add HFP at a time when from 70 to 95 mass % of TFE in the total amount to be used in the polymerization reaction is supplied to the polymerization reactor. A method of collectively adding HFP is preferred. The time of initiating the addition of HFP is the time of initiating the second step.

In the second step, added HFP is copolymerized, whereby a modified PTFE aqueous emulsion is obtained.

The solid concentration of the modified PTFE aqueous emulsion is preferably from 10 to 45 mass %, more preferably from 15 to 45 mass %, further preferably from 20 to 43 mass %.

When the solid concentration falls within the above range, the desired particles can be efficiently aggregated in the subsequent coagulation step.

"Time when from 70 to 95 mass % of TFE in the total amount to be used in the polymerization is added to the polymerization reactor" is specifically "from a time when 70 mass % of TFE in the total amount to be used in the polymerization is added to the polymerization reactor until a time before more than 95 mass % of TFE in the total amount to be used in the polymerization is added to the polymerization reactor".

The mass ratio of the core part to the shell part can be controlled by the mass ratio of TFE polymerized until the time of adding HFP to TFE polymerized after adding HFP.

For example, by adding HFP at the time when 70 mass % of TFE in the total amount to be used in the polymerization is added to a polymerization reactor, a modified PTFE fine powder having the mass ratio of the core part:shell part of almost 70:30 is obtained.

[Polymerization Condition]

As the polymerization condition, the polymerization temperature is preferably from 10 to 95° C., more preferably from 15 to 90° C. through the first step and the second step.

The polymerization pressure is preferably from 0.3 to 4.0 MPa, more preferably from 0.6 to 3.5 MPa.

The total polymerization time in the first step and the second step is preferably from 100 to 520 minutes, more preferably from 110 to 450 minutes.

[Coagulation Step and Drying Step]

The modified PTFE aqueous emulsion obtained by two steps is coagulated to obtain a modified PTFE fine powder. A known method can be applied as a coagulation method.

That is, as a case requires, the modified PTFE aqueous emulsion obtained by two steps is diluted with water so as to have a solid concentration of from 10 to 20 mass %, followed by vigorously stirring for coagulation. Here, as a case requires, the pH may be adjusted. Further, a coagulation aid such as an electrolyte or an aqueous organic solvent may be added.

Thereafter, the coagulated fine particles are moderately stirred to be removed from water, and as a case requires, the obtained wet powder is granulated and sieved, followed by drying. Thus, the modified PTFE fine powder is obtained.

The drying is carried out under a state that the wet powder is not flowed so much, preferably carried out under a state that the wet powder is left to stand.

As the drying method, vacuum drying, radio-frequency drying and hot air drying may be mentioned. The drying temperature is preferably from 100 to 250° C., more preferably from 100 to 200° C.

<Electric Wire Coating, Tube Material/Electric Wire and Tube>

The modified PTFE fine powder of the present invention is suitable for a long size material to be manufactured through steps of continuous extrusion by a paste extrusion molding method and then drying and sintering. As the long size material, a coating layer of an electric wire and a tube may be mentioned.

The modified PTFE fine powder of the present invention is suitable in an application of forming a coating layer of an electric wire or in an application of producing a tube.

The electric wire of the present invention is an electric wire having a coating layer formed by using the modified PTFE fine powder of the present invention.

The tube of the present invention is a tube formed by using the modified PTFE fine powder of the present invention.

A method for producing an electric wire through a step of forming a coating layer of an electric wire by using the modified PTFE fine powder of the present invention may be appropriately carried out by a known method.

Specifically, an electric wire can be produced by a method of forming a coating layer on the outer periphery of a core wire by a paste extrusion molding method using the modified PTFE fine powder, following by drying and sintering it.

As the method for producing a tube by using the modified PTFE fine powder of the present invention, a method of forming a tube by a paste extrusion molding method and drying and sintering it may be employed.

The paste extrusion molding is a method of mixing the modified PTFE fine powder and a lubricant to prepare a mixture having flowability and extrusion molding it.

The lubricant is preferably naphtha or a petroleum hydrocarbon having a dry point of at least 100° C.

An additive such as a pigment may be added to the mixture for coloring, and various fillers may be added for improving strength, antistatic property, conductivity, etc.

The blend proportion of the lubricant may be appropriately selected so that the modified PTFE fine powder would have flowability, and for example, the lubricant is preferably from 10 to 30 mass %, particularly preferably from 15 to 20 mass % per the total amount of the modified PTFE fine powder and the lubricant.

After the extrusion molding, a drying step of removing the lubricant and a sintering step are usually carried out by known methods.

<Effect>

As shown in after mentioned Examples, also its reason is not clearly understood, according to the present invention, in the system of copolymerizing TFE and two types of modifying agents (HFP and monomer (I)) to produce a modified PTFE fine powder, the primary particle size of the modified PTFE fine powder can be controlled to small by adding a monomer (II), and defects such as whitening at the time of sintering can be prevented.

Although the monomer (II) is added, the standard specific gravity (SSG) is maintained, and the productivity of a fine powder and the paste extrusion processability are not impaired.

Particularly, a coating layer of an electric wire is colored a predetermined color for identification in many cases, and thereby it is important to prevent defects such as whitening in appearance at the time of sintering.

EXAMPLES

Now, the present invention will be described in detail with reference to Examples. However, the present invention is by no means restricted thereto.

[Measuring Methods]

(A) Average Primary Particle Size of Modified PTFE Fine Powder (Unit: μm)

The average primary particle size was measured by means of a laser scattering particle size distribution analyzer (tradename "LS230", manufactured by Coulter Co., Ltd.).

(B) Standard Specific Gravity (SSG) of Modified PTFE Fine Powder

SSG was measured in accordance with ASTM D1457-10 and D4895-10. 12.0 g of a modified PTFE fine powder was weighed and held in a cylindrical mold having an inner diameter of 28.6 mm for two minutes under 34.5 MPa to prepare a molded sample. The molded sample was put in an oven of 290° C. and heated at a rate of 120° C./hr. After being held at 380° C. for 30 minutes, the molded sample was cooled at a rate of 60° C./hr and held at 294° C. for 24 minutes. Then, the molded sample was held in a desiccator of 23° C. for 12 hours, and the mass of the molded sample at 23° C. in air and the mass in water were measured. The specific gravity value of the molded sample to water at 23° C. was obtained. The obtained value was multiplied by the density value of water at 23° C. to obtain a value of standard specific gravity.

(C) Evaluation of Extrusion Pressure

The extrusion pressure was measured by the method described in ASTM4895-10, section 10.8. 200 g of a modified PTFE fine powder which was left at room temperature for more than 2 hours, was put into a glass bottle having an internal capacity of 900 cc, and 60 mL of a lubricant (trade name "Multipar H" (registered trademark), manufactured by Multisol) was added, followed by mixing for 25 minutes to obtain a PTFE fine powder mixture. The obtained PTFE fine powder mixture was left in a constant temperature chamber at 30° C. for 2 hours and preform molded at 100 psi (weight pound/inch$^2$) and then extruded through an orifice having a diameter of 0.79 mm, a land length of 0.38 mm and a cone angle of 30°, at 25° C. under conditions of a reduction ratio (ratio of the cross-section of the inlet to the cross-section of the outlet of the die) of 1,600 and an extrusion rate of 18 mm/min, to obtain a paste extrudate (bead). The pressure required for the extrusion at that time was measured, and it was designated as the extrusion pressure.

(D) Measurement of Content of Comonomers

FT-IR (FT/IR4100, Manufactured by JASCO Corporation)

A PTFE fine powder was left at room temperature (from 18 to 25° C.) for more than 2 hours to dry. 0.01 g of the dried PTFE fine powder was put in a mold having an inner diameter of 3 mm and a height of 3 mm and pressurized by hand press for 30 seconds to prepare a sample to be measured.

The infrared absorption spectrum of the sample to be measured was measured by means of a Fourier transform infrared spectrophotometer (FT-IR, product name: FT/IR4100, manufactured by JASCO Corporation).

The content of the PPVE units in the total particles is a value (mass %) given by multiplying a ratio of an absorption of infrared absorption band at 935 cm$^{-1}$ to an absorption at 993 cm$^{-1}$ by the coefficient of the conversion factor 0.135.

The content of the HFP units in the total particles is a value (mass %) given by multiplying a ratio of an absorption of infrared absorption band at 35 cm$^{-1}$ to an absorption at 985 cm$^{-1}$ by the coefficient of the conversion factor 0.10.

The content of the PFBE units in the total particles was obtained by a solid $^{19}$F-NMR method. A 400 MHz NMR apparatus was used, the sample rotation number was set to 30 KHz, the flip angle was set to 45°, the pulse repetition waiting time was set to 4 seconds, and the accumulation number was set to 500 times or more. The compositional ratio of the TFE units to the PFBE units was calculated from the ratio of the peak intensity derived from $CF_3$ of PFBE (detected at a near of −81 ppm) and the peak intensity derived from $CF_2$ (detected at a near of −120 ppm) in the obtained 19$^F$ NMR spectrum.

The calculation formulae are mentioned in detail below.

Content of TFE units=$3(A-2B)/(3A-2B)$

Content of PFBE units=$4B/(3A-2B)$

Here, considering the chemical shift in a case where the main chain $CF_2$ in PTFE is −120 ppm, A and B are calculated as the following integrated values.

A=an integrated value in a range of from −95 to −145 ppm+an integrated value of spinning side bands The spinning side bands were integrated under a condition having no problem for calculating peaks in general.

B=an integrated value within the range of from −80 to −85 ppm (E) Mass Ratio of Core:Shell The mass ratio of the core part to the shell part is a mass ratio of TFE polymerized before the time of adding HFP to TFE polymerized after adding HFP.

(F) Appearance of Extruded Bead After Sintering

An extrudate (bead) was produced in the same manner as in the method for measuring the extrusion pressure.

30 cm of the obtained extrudate was held in an oven of 220° C. for 2 hours to remove the lubricant and then further heated and sintered in the oven at 370° C. for 10 minutes to obtain a sintered product. Appearance of the obtained sintered product was visually observed. When the appearance was transparent and uniform, it was evaluated as ○ (good), and when the appearance was not uniform, for example whitening was observed, it was evaluated as x (poor).

Example 1

Into a 4,000 L-stainless steel autoclave equipped with a stirrer, 6.54 kg of a 30 mass % concentration-aqueous solution of $C_2F_5OC_2F_4OCF_2COONH_4$ (ammonium perfluoro-3,6-dioxaoctanoate, hereinafter referred to "APFDO") as an emulsifier, 35 kg of paraffin wax as a stabilizing aid and 2,200 L of deionized water were charged.

The inside of the autoclave was flushed with nitrogen and then depressurized, and 60 g of PFBE and 515 g of PPVE were charged. Then, the autoclave was pressurized with TFE, and the temperature was raised to 77° C. with stirring.

Then, the autoclave was pressurized with TFE to 10.34 bar (1.034 MPa), and 50 L of deionized water having 13.7 g of ammonium persulfate dissolved therein as a polymerization initiator was injected. Then, the polymerization was carried out, while adding TFE so as to maintain the inner pressure of the autoclave at 10.34 bar (1.034 MPa).

In the middle of the polymerization, 15.9 kg of a 30% aqueous solution of APFDO and 71.8 g of disuccinic acid peroxide (concentration 70%, and the balance is water) as a polymerization initiator were added. Further, in the middle of the polymerization, the temperature was raised to 80° C.

Further, in the middle of the polymerization, 1,172 g of disuccinic acid peroxide (concentration 70%, and the balance is water) was added.

Further, when the amount of added TFE became 967 kg (87.9 mass % in the total amount of TFE to be supplied), 625 g of HFP was charged. When the amount of added TFE became 1,100 kg, the reaction was terminated, and TFE in the autoclave was released. The polymerization time was 140 minutes.

The obtained PTFE aqueous emulsion was cooled, and the supernatant paraffin wax was removed. The solid content concentration in the PTFE aqueous emulsion was about 30 mass %. Further, coagulum in the autoclave was in trace amounts.

In this Example, the amount of the used emulsifier was 6.732 kg in total, namely about 6,082.8 ppm, per 1,100 kg of the finally obtained modified PTFE. Further, the amount of the used stabilizing assistant was 35 kg in total, namely about 1.59 mass %, per 2,200 L of deionized water.

The average primary particle size of the PTFE fine particles in the obtained PTFE aqueous emulsion was measured. Result is shown in Table 1 (the same applies hereinafter).

The PTFE aqueous emulsion was diluted with deionized water to be 10 mass %, controlled at 26° C. and stirred to be aggregated to obtain a wet powder. Then, the wet powder was dried at 160° C. to obtain a modified PTFE fine powder.

By the above described methods, SSG, the paste extrusion pressure, the content of each comonomer, the mass ratio of the core part:the shell part and the appearance of the extruded bead after drying and sintering were evaluated. Results are shown in Table 1 (the same applies hereinafter).

Example 2

The polymerization reaction was carried out in the same manner as in Example 1 to obtain a PTFE aqueous emulsion, except that the amount of added PFBE was changed to 30 g. The polymerization time was 130 minutes. The solid content concentration of the PTFE aqueous emulsion was about 30 mass %.

The PTFE aqueous emulsion was treated in the same manner as in Example 1 to obtain a wet powder, and the wet powder was dried to obtain a modified PTFE fine powder.

Comparative Example 1

The polymerization reaction was carried out to obtain a PTFE aqueous emulsion in the same manner as in Example 1, except that PFBE was not added. The polymerization time was 130 minutes. The solid content concentration of the PTFE aqueous emulsion was about 30 mass %.

The PTFE aqueous emulsion was treated to obtain a wet powder in the same manner as in Example 1, and the wet powder was dried to obtain a modified PTFE fine powder.

TABLE 1

| | | Example 1 | Example 2 | Comparative Example 1 |
|---|---|---|---|---|
| Content of comonomer [mass %] | HFP | 0.014 | 0.014 | 0.014 |
| | Monomer (I) (PPVE) | 0.028 | 0.028 | 0.028 |
| | Monomer (II) (PFBE) | 0.005 | 0.003 | — |
| | Sum of comonomers | 0.047 | 0.045 | 0.042 |
| Mass ratio of core part: shell part | | 87.9:12.1 | 87.9:12.1 | 87.9:12.1 |
| Primary particle size [μm] | | 0.234 | 0.237 | 0.284 |
| Standard specific gravity (SSG) | | 2.182 | 2.192 | 2.187 |
| Paste extrusion pressure [MPa] | | 44 | 37 | 35 |
| Extruded bead appearance after firing | | ○ | ○ | x |

As shown in the results in Table 1, all of Examples 1 and 2 and Comparative Example 1 are methods of copolymerizing TFE, HFP and the monomer (I) (PPVE) to produce a modified PTFE fine powder. The modified PTFE fine powder in Comparative Example 1 where the monomer (II) (PFBE) was not added, had an average particle size of 0.284 μm, while the modified PTFE fine powders in Examples 1 and 2 where the monomer (II) (PFBE) was added had a smaller average particle size of 0.234 μm and 0.237 μm respectively.

Further, the modified PTFE fine powders in Examples 1 and 2 had the almost same standard specific gravity (SSG) as in Comparative Example 1 and also had a similar paste extrusion pressure as the evaluation of the paste extrusion processability, to Comparative Example 1.

Further, in the evaluation of the appearance of the extrudate (bead) after drying and sintering, it was transparent and uniform in Examples 1 and 2 and had no problem, while the extrudate (bead) in Comparative Example 1 had whitening on the appearance.

This application is a continuation of PCT Application No. PCT/JP2016/059722, filed on Mar. 25, 2016, which is based upon and claims the benefit of priority from Japanese Patent Application No. 2015-087700 filed on Apr. 22, 2015. The contents of those applications are incorporated herein by reference in their entireties.

What is claimed is:

1. A modified polytetrafluoroethylene fine powder which is a fine powder of a non-melt-processable modified polytetrafluoroethylene, wherein the modified polytetrafluoroethylene comprises units derived from tetrafluoroethylene, units derived from hexafluoropropylene, units derived from a perfluoro(alkyl vinyl ether) represented by the formula (I) and units derived from a (perfluoroalkyl)ethylene represented by the formula (II):

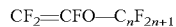
(I)

wherein n is an integer of from 1 to 6,

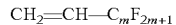
(II)

wherein m is an integer of from 3 to 7, and wherein the modified polytetrafluoroethylene fine powder has a core-shell structure comprising a core part made of a modified PTFE having no unit derived from the hexafluoropropylene and a shell part made of a modified PTFE having units derived from the hexafluoropropylene.

2. The modified polytetrafluoroethylene fine powder according to claim 1, which has an average primary particle size of from 0.20 to 0.28 μm.

3. The modified polytetrafluoroethylene fine powder according to claim 1, wherein the sum of the units derived from hexafluoropropylene, the units derived from a perfluoro(alkyl vinyl ether) and the units derived from a (perfluoroalkyl)ethylene, is at most 0.3 mass %, per a total mass of the fine powder.

4. The modified polytetrafluoroethylene fine powder according to claim 1, wherein the units derived from hexafluoropropylene is from 0.005 to 0.090 mass %, the units derived from a perfluoro(alkyl vinyl ether) is from 0.01 to 0.20 mass %, and the units derived from a (perfluoroalkyl)ethylene is from 0.001 to 0.010 mass %, per a total mass of the fine powder.

5. The modified polytetrafluoroethylene fine powder according to claim 1, wherein the core part:shell part representing the mass ratio of the core part to the shell part is from 70:30 to 95:5.

6. A method for manufacturing the modified polytetrafluoroethylene fine powder according to claim 1, the method comprising a first step of polymerizing tetrafluoroethylene, the perfluoro(alkyl vinyl ether) and the (perfluoroalkyl)ethylene in the presence of an aqueous medium, a polymerization initiator and an emulsifier and a second step of adding hexafluoropropylene so as to be polymerized with tetrafluoroethylene.

7. The method according to claim 6, wherein the modified polytetrafluoroethylene fine powder has a core-shell structure and wherein in the first step, tetrafluoroethylene is continuously or intermittently supplied to a polymerization reactor, and at a time when from 70 to 95 mass % of tetrafluoroethylene in the total amount to be used in the polymerization reaction is supplied, the second step is initiated by adding hexafluoropropylene.

8. The method according to claim 6, wherein the emulsifier is at least one fluorinated emulsifier selected from the group consisting of a $C_{5-8}$ fluorinated carboxylic acid having an etheric carbon atom and salts thereof.

9. A method for coating an electric wire, the method comprising:
providing a mixture comprising the modified polytetrafluoroethylene fine powder according to claim 1; and
coating at least a portion of the electric wire with the mixture thereby producing an electric wire having a coating layer.

10. An electric wire having a coating layer, produced by the method according to claim 9.

11. A method for producing a tube, the method comprising:
providing a mixture comprising the modified polytetrafluoroethylene fine powder according to claim 1; and
molding the mixture thereby producing the tube.

12. A tube, produced by the method according to claim 11.

* * * * *